United States Patent
Xu et al.

(10) Patent No.: US 7,280,805 B2
(45) Date of Patent: Oct. 9, 2007

(54) LO LEAKAGE AND SIDEBAND IMAGE CALIBRATION SYSTEM AND METHOD

(75) Inventors: Zhiwei Xu, Los Angeles, CA (US); Shan Jiang, San Gabriel, CA (US); Charles Chien, Newbury Park, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 430 days.

(21) Appl. No.: 10/888,842

(22) Filed: Jul. 9, 2004

(65) Prior Publication Data

US 2006/0009171 A1   Jan. 12, 2006

(51) Int. Cl.
*H04B 17/00* (2006.01)
*H03C 1/62* (2006.01)

(52) U.S. Cl. .............................. 455/67.11; 455/67.14; 455/115.2; 455/114.1

(58) Field of Classification Search .............. 455/63.1, 455/67.11, 67.14, 115.1, 115.2, 115.3, 114.1–114.4, 455/296, 302, 310
See application file for complete search history.

(56) References Cited

U.S. PATENT DOCUMENTS

| | | | | |
|---|---|---|---|---|
| 5,574,994 A | * | 11/1996 | Huang et al. | 455/126 |
| 5,628,059 A | * | 5/1997 | Kurisu | 455/126 |
| 6,744,324 B1 | * | 6/2004 | Adams et al. | 331/17 |
| 6,819,910 B2 | * | 11/2004 | Shi et al. | 455/126 |
| 6,961,547 B2 | * | 11/2005 | Rozenblit et al. | 455/118 |
| 6,968,167 B1 | * | 11/2005 | Wu et al. | 455/251.1 |
| 2002/0191713 A1 | * | 12/2002 | McVey | 375/308 |
| 2003/0095607 A1 | * | 5/2003 | Huang et al. | 375/296 |
| 2004/0032913 A1 | * | 2/2004 | Dinur | 375/298 |
| 2004/0106380 A1 | * | 6/2004 | Vassiliou et al. | 455/73 |
| 2004/0230393 A1 | * | 11/2004 | Andersson | 702/107 |
| 2005/0026577 A1 | * | 2/2005 | Chiu | 455/130 |
| 2005/0148304 A1 | * | 7/2005 | Jerng | 455/75 |

* cited by examiner

*Primary Examiner*—Duc M. Nguyen
(74) *Attorney, Agent, or Firm*—DLA Piper US LLP (57) ABSTRACT

A system or method for calibrating an RF transmitter includes inputting a test tone to the RF transmitter. LO leakage calibration is performed on an output of the RF transmitter with the test tone inputted thereto, in order to determine a minimum LO leakage. Thereafter, sideband image calibration is performed on the output of the RF transmitter with the test tone inputted thereto, in order to determine a minimum sideband image. Operational values for the RF transmitter are stored in memory based on the detected minimum LO leakage and the detected minimum sideband image, to be used during a normal operation mode of the RF transmitter.

19 Claims, 11 Drawing Sheets

LO LEAKAGE AND SIDEBAND IMAGE CALIBRATION SYSTEM AND METHOD

BACKGROUND OF THE INVENTION

A. Field of the Invention

The present invention relates generally to the field of wireless communications. More particularly, the present invention relates to LO leakage and sideband image calibration for a wireless communication system, and more specifically for an RF transmitter.

B. Background

Recently, the demand for wireless communication systems has grown significantly, such as for wireless local area networks (LAN), home wireless control systems and wireless multimedia centers. Along with this growth in demand, there has also been a concomitant increased interest in more bandwidth, more powerful and cheaper chip systems. For example, the maximum 11 Mb/s bandwidth offered by the 802.11b standard cannot satisfy the requirements of most users. Rather, a higher bandwidth chip, such as a 54 Mb/s chip offered by the 802.11g or 11a standard, is preferred. To transmit in this bandwidth with just a 20 MHz wide channel, more advanced modulation methods need to be adopted. In a 802.11a/g standard wide area network LAN (WLAN) system, the data is modulated with binary phase-shift-keying (BPSK), or quadrature phase-shift-keying (QPSK), or 16-level or 64-level quadrature amplitude modulation (16-ary QAM or 64-ary QAM), and further mapped into an orthogonal-frequency-division-multiplexing (OFDM) signal with 52 sub-carriers.

To take the advantage of the high bandwidth, an OFDM-based wireless system and a radio wave system with sophisticated modulation techniques pose significant implementation challenges requiring low in-band phase noise, high linearity and accurate matching of the RF transceiver chip. Among them, matching is the most complicated issue because it arises from device mismatch. Furthermore, the requirement for the chip mismatch is typically very tight as well. For example, in order to meet the transmitter Error Vector Magnitude (EVM) specification for 54 Mb/s mode in a WLAN system with a 3-dB implementation margin, which is the parameter to indicate the quality of a digital modulated signal, system simulation shows that an I/Q mismatch less than 1.5°/0.2 dB is required. Also, the transmitter LO leakage introduced by mismatch is imposed as unwanted signals, and therefore should be as small as possible in order to lessen any interference and noise problems.

An RF transmitter performs baseband signal modulation, up-conversion and power amplification. Compared with various approaches to implement an RF receiver, only a few architectures are currently available for a transmitter realization. This is because the noise, interferences rejection and band selection are more relaxed for a transmitter than they are for a receiver in a wireless communication system.

Figure 1:
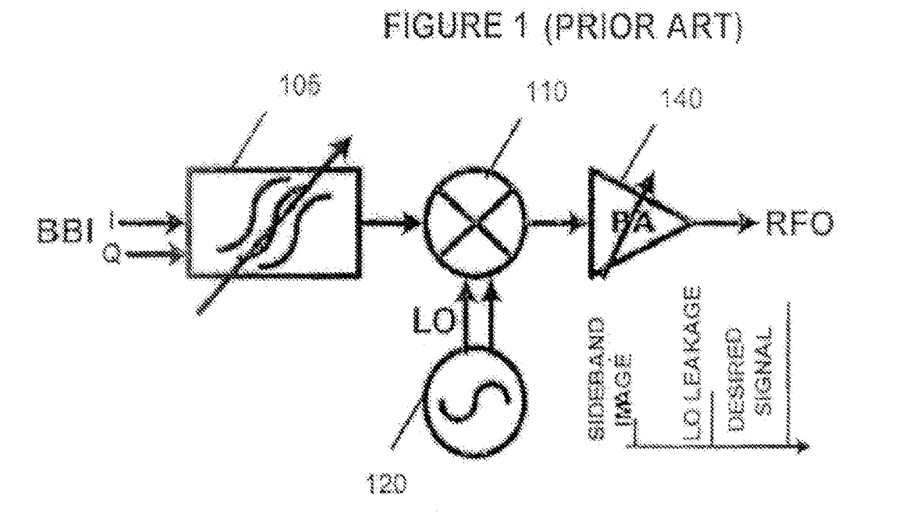
FIG. 1 shows a conventional direct conversion RF transmitter architecture.

If the transmitted carrier frequency is equal to the local oscillator (LO) frequency, such an architecture is termed a "direct conversion" architecture. As shown in FIG. 1, which corresponds to a direct conversion transmitter architecture, the signal modulation and up-conversion occur in a same circuit, whereby that same circuit corresponds to a mixer 110 and a local oscillator 120. The mixer 110 receives an LO signal from the LO 120, and mixes the LO signal with a baseband signal output by a baseband filter 105. The output of the mixer 110 is provided to a power amplifier 140, which provides sufficient power that is transferred to an antenna (not shown) and filters out-of-band components that result from nonlinearities.

However, some undesired in-band signals are introduced by circuit defects, such as quadrature LO signal amplitude and phase mismatch, baseband signal amplitude and phase mismatch, and device mismatch. Among them, the LO leakage and sideband modulation image mismatch are the most critical ones to degrade the transmission signal quality, whereby they respectively correspond to the leakage power at the exact LO frequency ($f_{LO}$) and at the sideband introduced by the quadrature mismatch. Both of them exist in the transmission band, and thus the power amplifier 140 and any following band pass filter (not shown) cannot filter them out.

Figure 2:
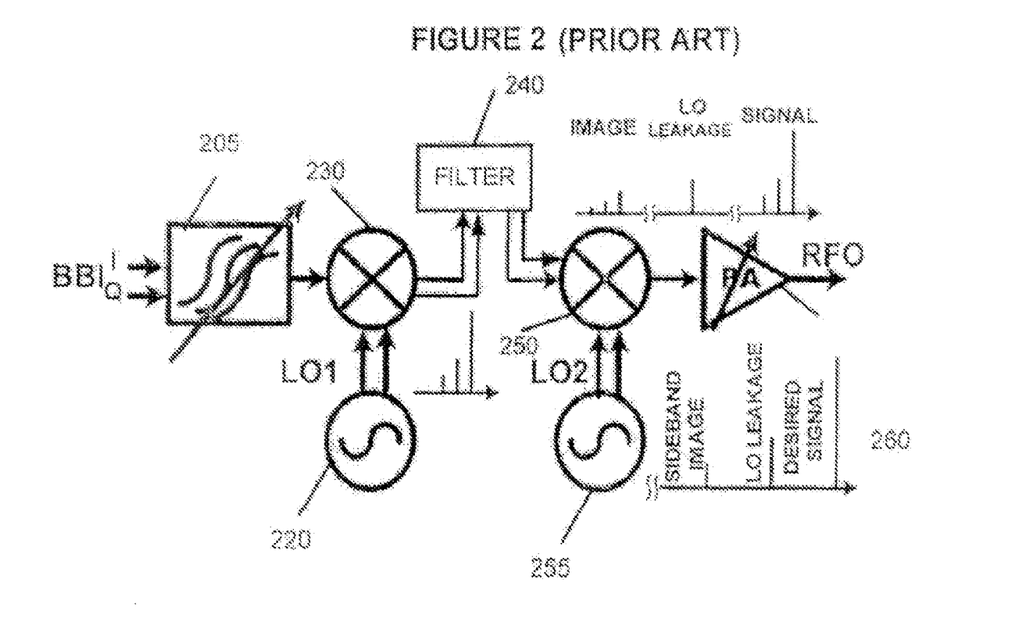
FIG. 2 shows a conventional two-step conversion RF transmitter architecture.

Another approach to up-convert a baseband signal to an RF frequency is to modulate the signal in two or more steps so that the output spectrum is far from the local oscillation frequency, which results in immunity of the frequency synthesizer to frequency pulling. FIG. 2 shows a two-step conversion transmitter architecture, whereby the baseband signal BBI undergoes quadrature modulation at a low frequency called an intermediate frequency (IF), and whereby that result is upconverted to the desired frequency through bandpass filtering and mixing with another LO frequency, which suppresses the harmonics of the IF signal. In more detail, a first local oscillator 220 provides a first LO signal LO1, which is mixed with the filtered baseband signal (a filter 205 filters the baseband signal BBI) by way of a first mixer 230. The output of the first mixer 230, which is at an IF band, is provided to an off-chip filter 240, whereby this completes the first step. The output of the off-chip filter 240 is provided to a second mixer 250, whereby it is mixed with a second LO signal LO2 output by a second local oscillator 255, in order to provide an RF signal. The RF signal is amplified by a power amplifier 260, to thereby provide an output RF signal RFO.

The advantage of this two-step upconversion over the direct conversion approach is that the signal quadrature mismatch is better because the modulation is performed at a low frequency (IF) as opposed to a high frequency (RF). However, the rejection of the unwanted sideband generated by the quadrature upconversion due to the mismatch is very tight, typically 50 to 60 dB. Also, the LO leakage is required to be very small because of Federal Communication Commission (FCC) requirements and other requirements.

No matter which transmitter architecture is used, the small mismatch of circuits and signals is preferred, to thereby allow more complicated modulation techniques to be used and which provides a higher transmission efficiency. However, device mismatch always exists and cannot be completely removed. Thus, precise calibration is required to improve the transmitter performance.

Figure 3:
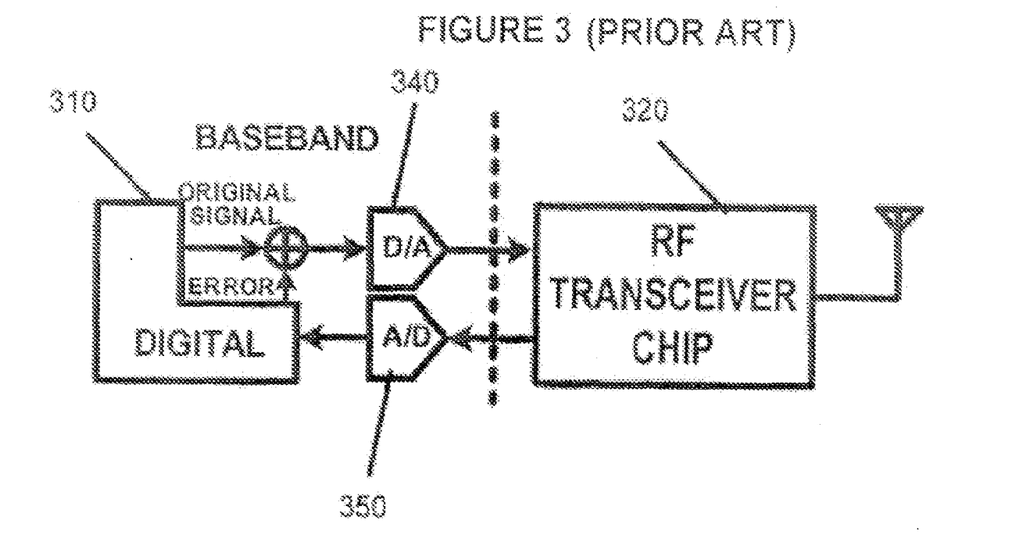
FIG. 3 shows a first type of conventional digital baseband calibration circuit for an RF transmitter.

Several calibration methods exist for RF transmitters in order to perform amplitude and phase calibration in a wireless system, whereby they can be divided into two categories in terms of the detection and calibration locations. In a first category, both the mismatch detection and calibration are done by a digital baseband. As shown in FIG. 3, a digital baseband circuit 310 transmits a pilot sequence to an RF transceiver 320, and is modulated into a high frequency by the RF transceiver 320. A D/A 340 and an A/D 350 provide digital/analog signal conversion between these two components. During calibration, the RF transceiver 320 connects the transmitter output to the receiver input so that the digital baseband circuit 310 can receive the demodulated signal at the same time. A digital signal processing (DSP) machine (not shown) inside the digital baseband circuit 310 is required to calculate the phase and amplitude mismatch of the RF link and generate the "error" signals to calibrate it into a "perfect" (non-mismatched) communication channel. Although the calibration is relatively easy to control in the digital domain, it imposes several disadvantages: 1) the DSP machine can take a long computation time to get the desired accuracy; 2) it cannot work without the receiver (a part of the RF transceiver 320); 3) the mismatch introduced by the receiver has to be considered, which is comparable with the mismatch from the transmitter (a part of the RF transceiver 320); 4) the hardware mismatch is intact and the performance degradation introduced by the mismatch, such as second order inter-modulation, still exists; and 5) extra connection between the transmitter and the receiver inside the RF transceiver 320 complicates the design.

Figure 4:
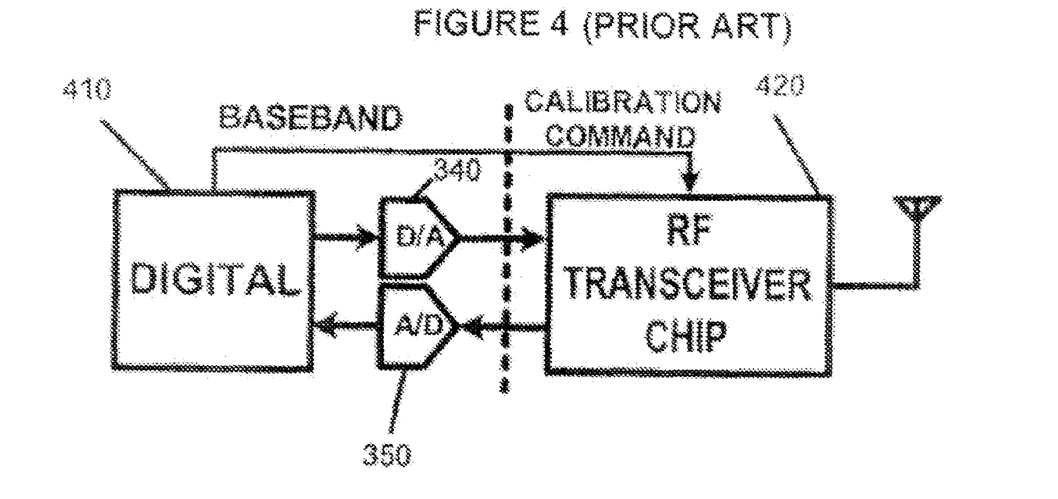
FIG. 4 shows a second type of conventional digital baseband calibration circuit for an RF transmitter.

In the second category of conventional calibration .methods, a digital baseband circuit is used to detect the signal mismatch while a specific circuit inside an RF transceiver performs the calibration under control of the digital baseband circuit. As shown in FIG. 4, the mismatch is detected by a digital baseband circuit 410 similar to previous case shown in FIG. 3, while the mismatch is calibrated out inside an RF transceiver 420 that is controlled by the digital baseband circuit 410. The disadvantages of this type of calibration are: 1) large analog-to-digital converter (ADC) needed with a DSP machine (internal to the digital baseband circuit 410) and long computation time required; 2) dependence on an RF receiver (a part of the RF transceiver 420); 3) introduction of the receiver mismatch; and 4) required extra connection between the transmitter and the receiver inside the RF transceiver 420 complicates the design.

SUMMARY OF THE INVENTION

One aspect of the present invention provides for a calibration control system and method for calibrating both LO leakage and sideband image for an RF transmitter or RF transceiver.

Another aspect of the present invention provides for a calibration control system and method that does not utilize a digital baseband unit during the calibration.

According to at least one aspect of the invention, there is provided a system for performing LO leakage and sideband image calibration for an RF transmitter. The system includes an LO leakage and sideband image sensor configured to sense an LO leakage amount and a sideband image amount of an output of the RF transmitter. The system also includes an analog-to-digital converter configured to convert the sensed LO leakage amount and the sensed sideband image amount to first and second sensed values, respectively. The system further includes a calibration control logic unit configured to receive the first and second sensed values and to perform calibration control on the RF transmitter by first calibrating for LO leakage suppression and then calibrating for sideband image suppression.

According to another aspect of the invention, there is provided a method for calibrating an RF transmitter, which includes a step of inputting a test tone to the RF transmitter. The method also includes a step of performing LO leakage calibration on an output of the RF transmitter with the test tone inputted thereto, in order to determine a minimum LO leakage. The method further includes a step of, thereafter, performing sideband image calibration on the output of the RF transmitter with the test tone inputted thereto, in order to determine a minimum sideband image. The method still further includes a step of storing operational values for the RF transmitter based on the detected minimum LO leakage and the detected minimum sideband image, to be used during a normal operation mode of the RF transmitter.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

Figure 5:
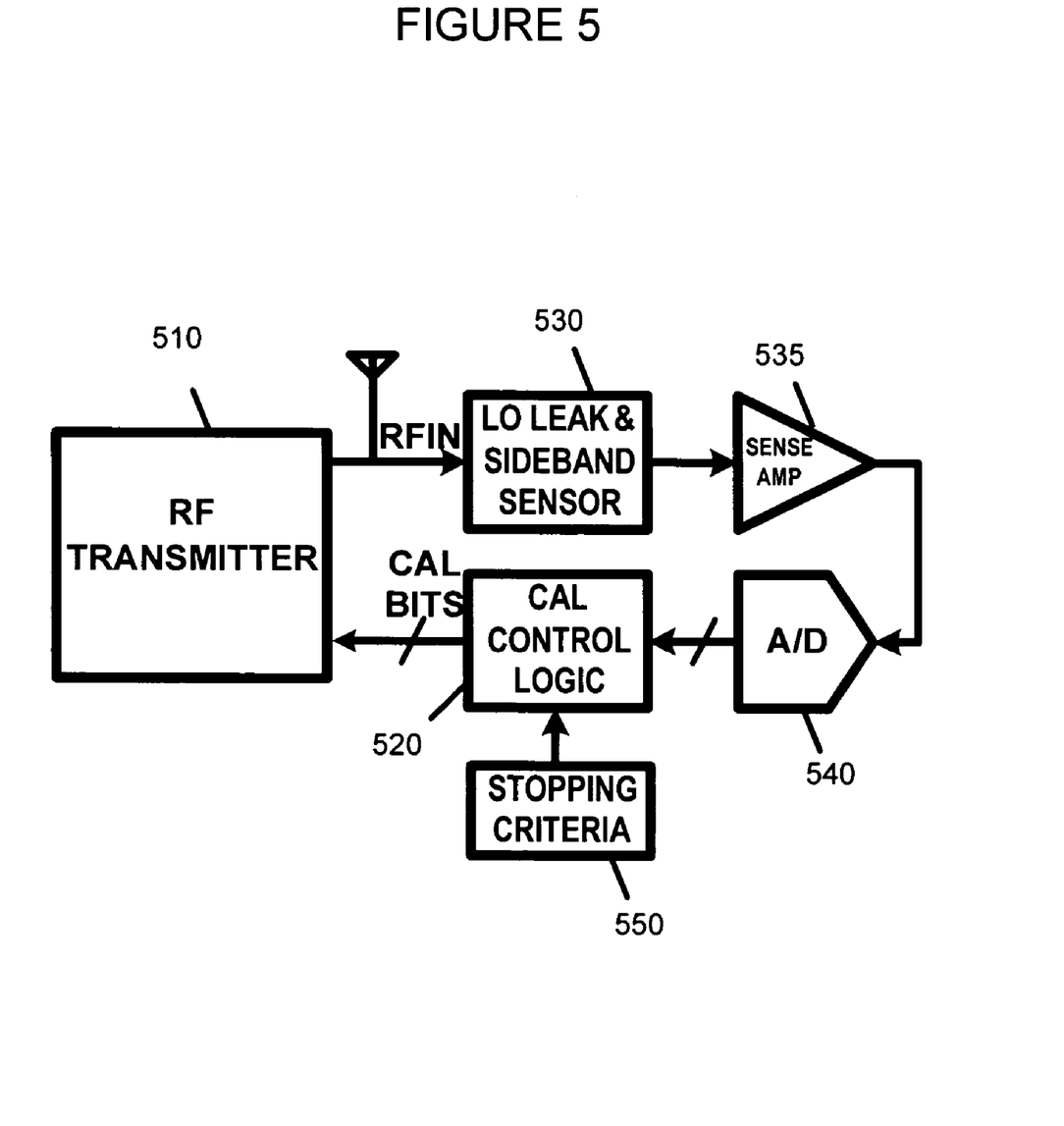
FIG. 5 shows a calibration system for an RF transmitter according to a first embodiment of the invention.

The present invention according to at least one embodiment is directed to an LO leakage and sideband image mismatch system and method. FIG. 5 shows a calibration system for calibrating transmitter LO leakage and sideband image introduced by the mismatches, according to a first embodiment of the invention. During calibration, an RF transmitter 510 outputs a single tone RFIN. RFIN may be provided by way of a crystal oscillation circuit inside a frequency synthesizer of the RF transmitter 510, for example. A calibration control logic unit 520 sets a calibration code within the RF transmitter 510 (by way of calibration bits provided to the RF transmitter 510), which enables a calibration sequence to take place. An LO leakage and sideband sensor circuit 530 measures both the LO leakage strength and the sideband image strength of the single tone output RFIN of the RF transmitter 510.

An analog-to-digital converter (ADC) 540 digitizes the LO leakage and sideband image values that have been amplified by a sense amplifier 535 after having been output by the LO leakage and sideband sensor circuit 530. By way of example and not by way of limitation, those values may range from −45 dBC to −20 dBc for the LO leakage and from −50 dBc to −25 dBc for the sideband image. The ADC range preferably covers the system requirement to the LO leakage and sideband image rejection ratio, which may be, for example, −25 dBc and −40 dBc, respectively. This corresponds to a 0.4 dB differential mismatch and 1°/0.2 dB quadrature mismatch in the transmitter chain. With a digitized value for the LO leakage and the sideband image thereby provided by the ADC 540, a digital comparator (not shown, but it may be a part of the calibration control circuit 520 in one possible implementation) determines whether this calibration setting supports the minimum LO leakage and sideband image for the system.

Based on knowledge of the mismatch source inside the RF transmitter 510, a smart searching algorithm is utilized by the calibration control logic unit 520, which will be discussed in detail in the next section. The smart searching algorithm utilizes a stopping criteria 550 to determine when to stop the calibration process. For example, when the LO leakage is below −25 dBc and the sideband image is below −40 dBc, the calibration is stopped, and normal operation of the RF transmitter 510 may begin. The mismatch calibration is done digitally inside the RF transmitter 510, based on calibration bits provided to it from the calibration control logic unit 520.

Compared with conventional systems and methods to perform transmitter mismatch calibration, the calibration system and method according to the first embodiment has the advantages of: 1) stand alone calibration circuit without the involvement of an RF receiver and a baseband DSP machine; 2) small extra mismatch to the transmitter circuit introduced by the calibration circuit; 3) capability to calibrate to the minimum mismatch of the transmitter; 4) small chip area cost; and 5) faster calibration.

In one possible implementation, the calibration system of FIG. 5 can be part of a stand alone transmitter or transceiver chip. The LO leakage and sideband image sensor 530 measures the strength of the LO leakage and sideband image, whereby those signals are then amplified by the sense amplifier 535. The ADC 540, which only need to be a low accuracy and low speed in one possible implementation of the first embodiment, quantizes the amplified strength, and the calibration control logic unit 520 updates the mismatch settings accordingly. A searching algorithm that is based on the principle of the LO leakage and sideband image generation, is implemented inside the calibration control logic unit 520, whereby the stopping criteria 550 is used to determine when to stop the calibration. The entire calibration circuit of the first embodiment is small and can be embedded in a transmitter RF front end.

In a wireless RF transceiver system, an RF transmitter modulates a low frequency baseband input signal with a LO signal, to create a high frequency signal, and sends the high frequency signal out through a power amplifier. If baseband signals with exact 90° phase difference between them are sent to the transmitter with a quadrature mixer, the modulated output signal is a single side-band signal. However, because there are mismatches inside the RF transceiver and since the input signals are mismatched too, the LO signal and the sideband image cannot be cancelled completely and they exist in the transmission output as "unwanted" signals.

If a homodyne architecture is used for both the transmitter and receiver, the LO leakage and sideband image become in-band signals, and they degrade the RF signal transmission and receiving quality. The transmission signal spectrum for a homodyne architecture is shown in FIG. 1. If a two-step up-conversion architecture is adopted inside the transmitter, as shown in FIG. 2, although the LO Leakage and sideband image generated by the second LO is far away from the desired RF band and does not affect the receiving, there are still LO leakage and sideband image introduced by the first LO modulation, which belong to the in-band signals. Furthermore, there are more concerns about the LO leakage and sideband image generated by the second LO modulation, which may result in an FCC violation. For a multi-LO modulation transmitter architecture, the same problems exist.

The mismatch comes from the LO, the upconversion mixer, the power amplifier and the low speed baseband circuit, whereby the baseband circuit typically includes a channel selection filter and a baseband variable gain amplifier (VGA).

The inventors of this application have realized that the mismatch sources introducing the LO leakage and sideband image are significantly different from each other. In a quadrature transmitter, the differential mismatch of the circuit and signals contribute to the LO leakage, which include the input baseband signal differential mismatch, baseband circuit differential mismatch, LO signal differential mismatch and up-conversion mixer differential mismatch. The differential mismatch includes both phase mismatch and amplitude mismatch. For the sideband image, it is mainly because of the mismatch between the signals and circuits of the I branch and the Q branch of a quadrature system, which includes the contribution from input baseband signal quadrature mismatch, baseband circuit quadrature mismatch, LO signal quadrature mismatch and upconversion quadrature mismatch, which are also composed of the amplitude mismatch and phase mismatch.

Assuming that a single tone input signal frequency is $f_s$ and $\omega_s=2\pi f_s$, single arm amplitude is A, the differential amplitude mismatches of I branch and Q branch equal to $a_{i1}$ and $a_{q1}$, the differential phase mismatches of I branch and Q branch equal to $\phi_{i1}$ and $\phi_{q1}$ and the amplitude and phase quadrature mismatches are $a_{iq1}$, and $\phi_{iq1}$ respectively, the input signals can be expressed as $I$ branch=$A \cos \omega_s t + A(1+a_{i1})\cos(\omega_s t + \phi_{i1})$ $Q$ branch=$A(1+a_{iq1})\sin(\omega_s t+\phi_{iq1})+A(1+a_{iq1})(1+a_{q1})\sin(\omega_s t+\phi_{iq1}+\phi_{q1})$ If the baseband circuit, including the filter and VGA, has gain B, differential gain mismatch $a_{i2}$ and $a_{q2}$, differential phase mismatch $\phi_{i2}$ and $\phi_{q2}$ for I and Q branch and quadrature amplitude mismatch $a_{iq2}$ and $\phi_{q2}$ between I and Q, the output signal from the baseband circuit are $I$ branch=$AB \cos \omega_s t + AB(1+a_{i1})(1+a_{i2}) \cos(\omega_s t + \phi_{i1}\phi_{i2})$ $Q$ branch=$AB(1+a_{iq1})(1+a_{iq2})\sin(\omega_s t+\phi_{iq1}+\phi_{iq2}) +AB(1+a_{iq1})(1+a_{q1})(1+a_{iq2})\sin(\omega_s t+\phi_{iq1}+\phi_{iq2}+\phi_{q1}+\phi_{q2})$ Considering the LO signal differential phase mismatch $\phi_{i3}$ for I branch, $\phi_{q3}$ for Q branch and the quadrature phase mismatch $\phi_{iq3}$, the quadrature up-conversion mixer has $a_{i4}$, $\phi_{i4}$ mismatch for mixer I branch, $a_{q4}$, $\phi_{q4}$ mismatch for Q branch, $a_{iq4}$, $\phi_{iq4}$ mismatch between I and Q branch, the output of the quadrature mixer can be expressed as:

$$[AB \cos \omega_s t + AB(1+a_{i1})(1+a_{i2})(1+a_{i4})\cos(\omega_s t + \phi_{i1} + \phi_{i2} + \phi_{i4})(\sin \omega_{LO} t + \sin(\omega_{LO} t + \phi_{i3}))] + [AB(1+a_{iq1})(1+a_{iq2})(1+a_{iq4})\sin(\omega_s t + \phi_{iq1} + \phi_{iq2} + \phi_{iq4}) + AB(1+a_{iq1})(1+a_{q1})(1a_{iq2})(1+a_{q2})(1+a_{iq4})(1+a_{q4})\sin(\omega_s t + \phi_{iq1} + \phi_{iq2} + \phi_{q1} + \phi_{q2} + \phi_{iq4} + \phi_{q4})(\cos(\omega_{LO} t + \phi_{iq3}) + \cos(\omega_{LO} t + \phi_{iq3} + \phi_{q3}))]$$

, where $\omega_{LO} = 2\pi f_{LO}$, $f_{LO}$ is the LO signal frequency.

Decomposing the output signal into three parts:

The desired signal is $2AB(1+\epsilon)\sin(\omega_{LO} t + \omega_s t)$; where $\epsilon$ is a small quantity introduced by the mismatches.

The LO leakage can be expressed as:

$$4AB\left(f_i(a_{i1}, a_{i2}, a_{i4})\cos\left(\frac{\phi_{i3}}{2}\right)\sin(\phi_{i1} + \phi_{i2} + \phi_{i4})\sin(\omega_{LO} t) + f_q(a_{q1}, a_{q2}, a_{q4}, a_{iq1}, a_{iq2}, a_{iq4})\cos\left(\frac{\phi_{q3}}{2}\right)\sin(\phi_{q1} + \phi_{q2} + \phi_{q4})\cos(\omega_{LO} t + \phi_{iq3})\right)$$

; where the function $f_i$ and $f_q$ approximately equal to 1.

Also, the sideband image tone can be expressed as $$AB\sin(\omega_{LO} t - \omega_s t)$$

$$\left\{\cos\frac{\phi_{i3}}{2}\left[1+\left(1+\sum_{k=1,2,4}a_{ik}\right)\left(\cos\sum_{k=1,2,4}\phi_{ik} - \sin\sum_{k=1,2,4}\phi_{ik}\right)\right] - \left(1+\sum_{k=1,2,4}a_{iqk}\right)\cos\left(\sum_{k=1,2,4}\phi_{iqk} - \phi_{iq3}\right)\right.$$

$$\left.\cos\left(\frac{\phi_{q3}}{2}\right)\left[1+\left(1+\sum_{k=1,2,4}a_{qk}\right)\left(\cos\sum_{k=1,2,4}\phi_{qk} + \sin\sum_{k=1,2,4}\phi_{qk}\right)\right]\right\} -$$

$$AB\cos(\omega_{LO} t - \omega_s t)\left(1+\sum_{k=1,2,4}a_{iqk}\right)\sin\left(\sum_{k=1,2,4}\phi_{iqk} - \phi_{iq3}\right)$$

$$\cos\left(\frac{\phi_{q3}}{2}\right)\left[1+\left(1+\sum_{k=1,2,4}a_{qk}\right)\left(\cos\sum_{k=1,2,4}\phi_{qk} + \sin\sum_{k=1,2,4}\phi_{qk}\right)\right]$$

Considering there is a static phase delay γ through the up-conversion mixer and the PA pre-driver, the LO leakage is $C \sin(\omega_{LO} t + \gamma) + D \cos(\omega_{LO} t + \phi_{iq3} + \gamma)$, the sideband image tone is $E \sin(\omega_{LO} t - \omega_s t + \gamma) - F \cos(\omega_{LO} t - \omega_s t + \gamma)$, where C, D, E, F are functions of the mismatches.

Based on above analysis, one can draw the following conclusions. For the LO leakage; 1) Differential mismatches of the respective I and Q branch contribute to the LO leakage; 2) Quadrature mismatches between I and Q has few contributions and only amplify the LO leakage, if there is no differential mismatches, the only quadrature mismatches cannot generate the LO leakage; and 3) Differential phase mismatches are more important than the amplitude mismatches. Without these mismatches, there is no LO leakage.

For the sideband image: 1) Both quadrature mismatches and differential mismatches contribute to the sideband image strength; 2) The image tone is sensitive to the phase mismatches of the LO signals; and 3) The quadrature mismatches is more serious than the differential mismatches.

Based on the above observations as made by the inventors of this application, a mismatch calibration algorithm has been developed. First, the differential mismatch within I and Q branches is calibrated to the minimum. The LO leakage strength can serve as a metric of the differential mismatches because it is not sensitive to the quadrature mismatches. Once the differential calibration is done, the quadrature mismatch calibration begins according to the strength of the sideband image tone. Assuming there is no differential mismatches after the LO leakage calibration, the sideband image strength is only related to the mismatches between I and Q branches.

Since the phase mismatch introduced by the low frequency circuit mismatch is much smaller than the one introduced by the high frequency counterpart, the phase mismatch of the LO and upconversion mixer play a more important role, while the contributions of all amplitude mismatches are similar. Thus, the LO generator and up-conversion mixer inside the transmitter chip are preferably selected as the calibration blocks.

Figure 6:
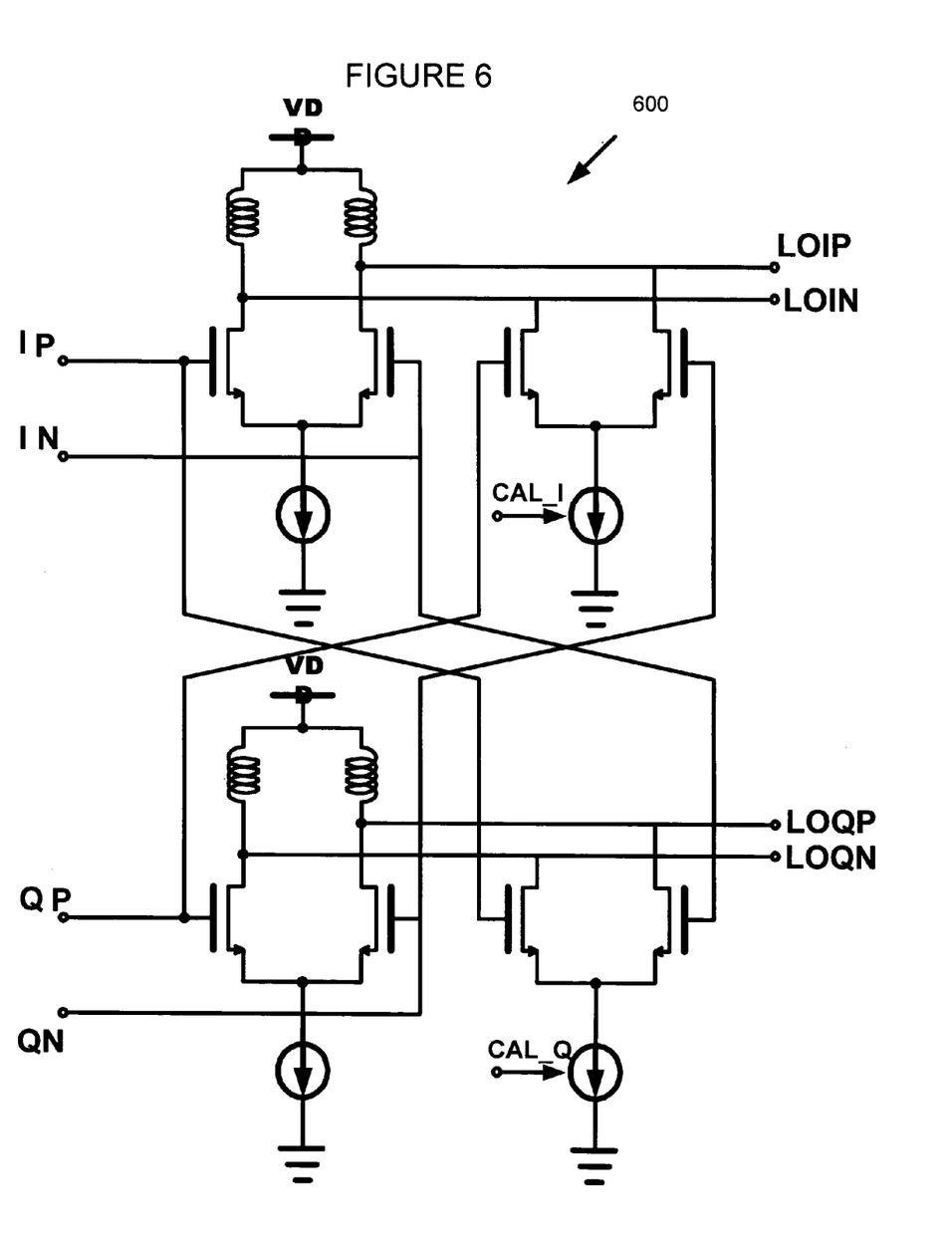
FIG. 6 shows an LO generator with calibration components, according to an embodiment of the invention.

FIG. 6 shows a calibration circuit for an LO generator 600, whereby the original I and Q LO signals IP, IN, QP, QN are interpolated to generate the new quadrature LO signals LOIP, LOIN, LOQP, LOQN, which can be controlled in both digital and analog domains. The LO generator 600 superposes the mismatched quadrature RF inputs in a certain proportion, and reconstructs the I/Q LO signals. The reconstruction ratio is controlled through the calibration current sources CAL_I and CAL_Q, which can be regulated either by digital or by analog. The new generated LO signals are expressed as:

$I$ branch $LO \sin(\omega_{LO} t) + \alpha\cos(\omega_{LO} t) \approx \sin(\omega_{LO} t + \theta)$ $Q$ branch $LO \cos(\omega_{LO} t) + \alpha\sin(\omega_{LO} t) \approx \cos(\omega_{LO} t - \theta)$.

Figure 7:
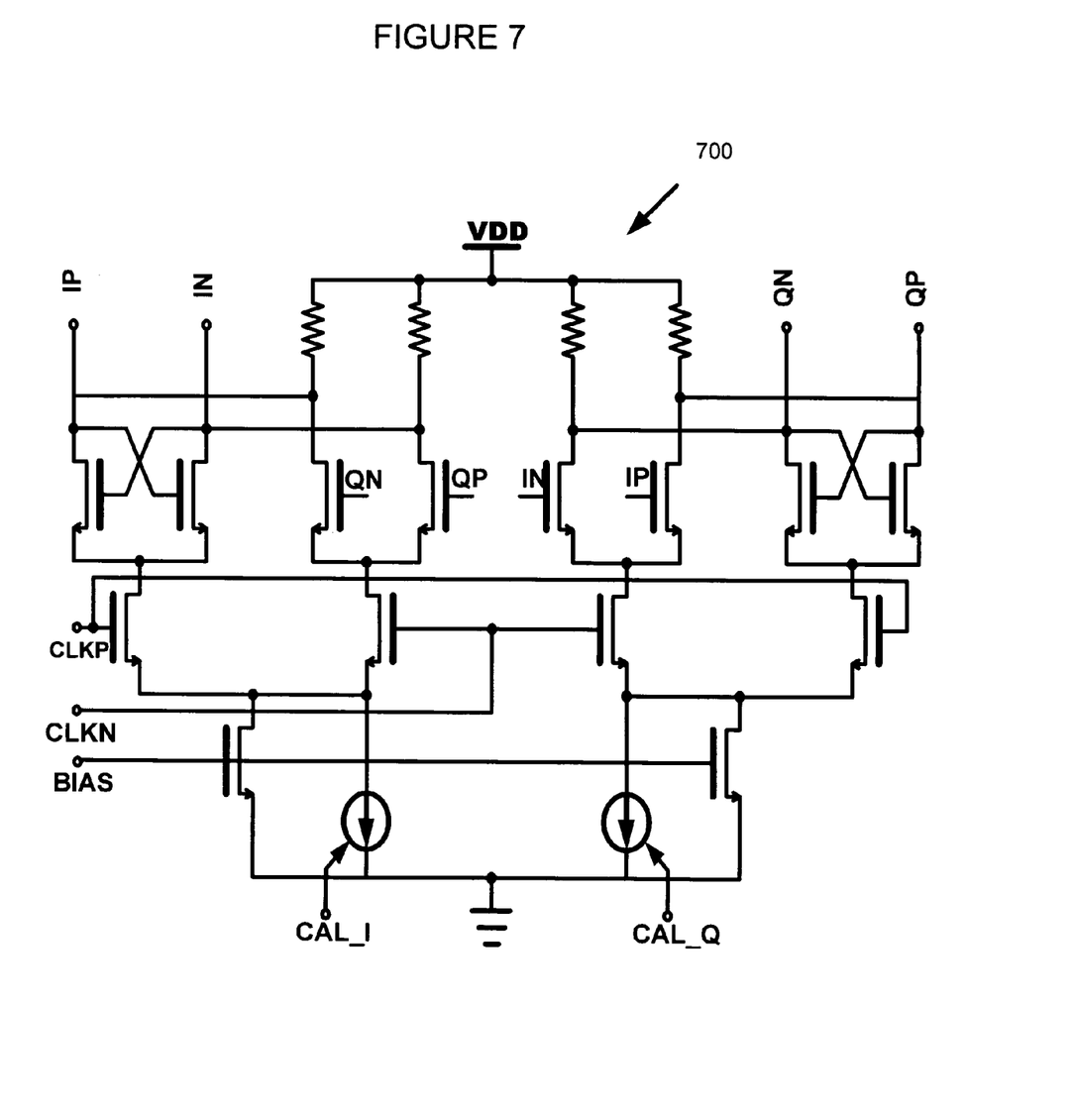
FIG. 7 shows a divide-by-two circuit with phase and amplitude tuning control, according to an embodiment of the invention.
Figure 8:
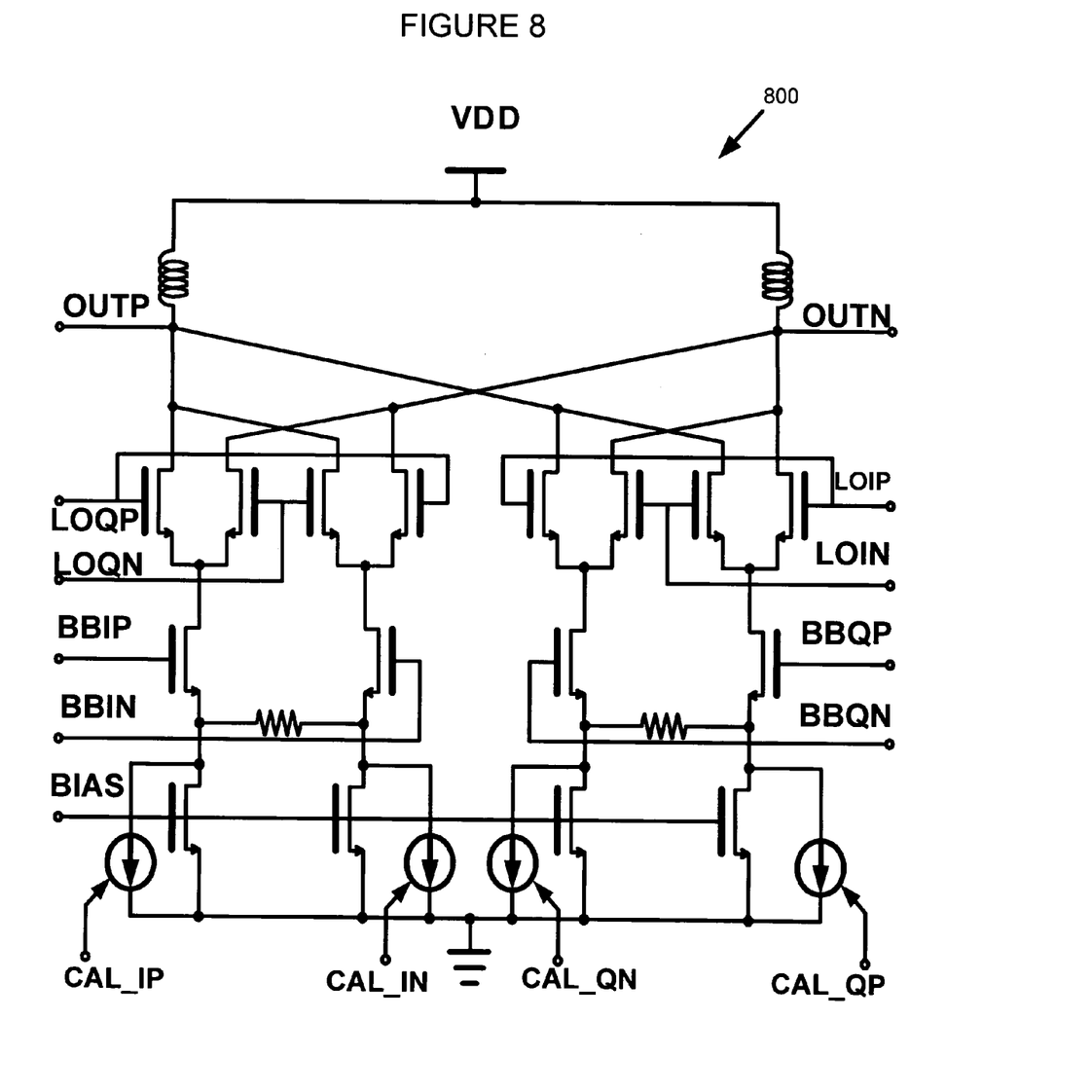
FIG. 8 shows a mixer with calibration components for performing differential mismatch calibration and sideband image calibration, according to an embodiment of the invention.

The quadrature phase difference can be tuned through this phase interpolation. Another way to do the quadrature LO signals calibration is to tune the quadrature LO signal generator, as shown in FIG. 7. This is done by increasing or decreasing the bias current in the I or Q branch of the quadrature LO signal generator 700 separately. A divide-by-2 circuit is shown in FIG. 7, whereby the phase and magnitude of the I and Q LO signals can be changed. For mismatches within an up-conversion mixer, they can be corrected through four digitally controlled bias current sources, which is shown in FIG. 8 for an up-conversion mixer 800 having a CAL_IP bias current source, a CAL_IN bias current source, a CAL_QN bias current source, and a CAL_QP bias current source. The differential mismatches are cancelled by digital control of the bias current sources within the I or the Q branch themselves, and the quadrature difference are calibrated out by increasing or decreasing the bias current sources in either the I or the Q branch. This type of calibration works for both the amplitude mismatch and the phase mismatch.

An example will now be given for a smart search algorithm using the circuit of FIG. 8, whereby the smart searching algorithm is performed by the calibration control logic unit 520 of FIG. 5. First, the LO leakage calibration is performed, whereby CAL_QP, CAL_QN, and CAL_IN maintain their original values, and whereby CAL_IP is regulated to search for the minimum LO leakage performance of the RF transmitter. After that is done, a further fine searching process can optionally proceed next, with CAL_IN, CAL_QP and CAL_QN regulated separately in a manner similar to how CAL_IP was regulated. Alternatively, the smart searching calibration process may proceed, without any fine searching, to the next step, sideband image calibration.

During image calibration, the CAL_QP and CAL_QN maintain their original values, while the CAL_IP and CAL_IN are regulated at a same level together, in order to search for a minimum sideband image value. Once this has been completed, the calibration process is done, whereby fine searching can also be optionally performed after the sideband image calibration step. One possible fine search method that can be used adjusts QP and QN or IP and IN together as a group.

While the above example was made with respect to changing the value of CAL_IP during the LO leakage calibration step, one of ordinary skill in the art will recognize that any of the other three bias current values may be regulated while maintaining the other three bias current values the same. Also, while the above example was made with respect to regulating the CAL_IP and CAL_IN values at the same level together while maintaining the CAL_QP and CAL_QN values at their original values, one of ordinary skill in the art will recognize that one alternatively can regulate the CAL_QP and CAL_QN at the same level together while maintaining the CAL_IP and CAL_IN values at their original values, or yet alternatively regulate the CAL_IP and CAL_IN values at a first level together while regulating the CAL_QP, CAL_QN values as a second level together, while remaining within the scope of the invention.

As discussed earlier, a sensor circuit is used to measure the LO leakage strength and the sideband image strength. For a case where there is a baseband quadrature single tone input to be provided to an RF transceiver system, the ideal transmitter output is a single tone at an RF frequency. However, the output will typically have an LO leakage and sideband image tone because of mismatches in circuits of the RF transceiver system, whose strengths are generally −20 dBc and −30 dBc without calibration. Assuming the desired signal output strength is 0 dBm, the strength of the LO leakage and sideband image tone are −20 dBm and −30 dBm without calibration. The required LO leakage and sideband image tone may be below −30 dBc and −40 dBc, for example, which is equivalent to a −30 dBm LO leakage tone and −40 dBm sideband image tone when the output power is 0 dBm and input signal is a quadrature single tone.

Figure 9:
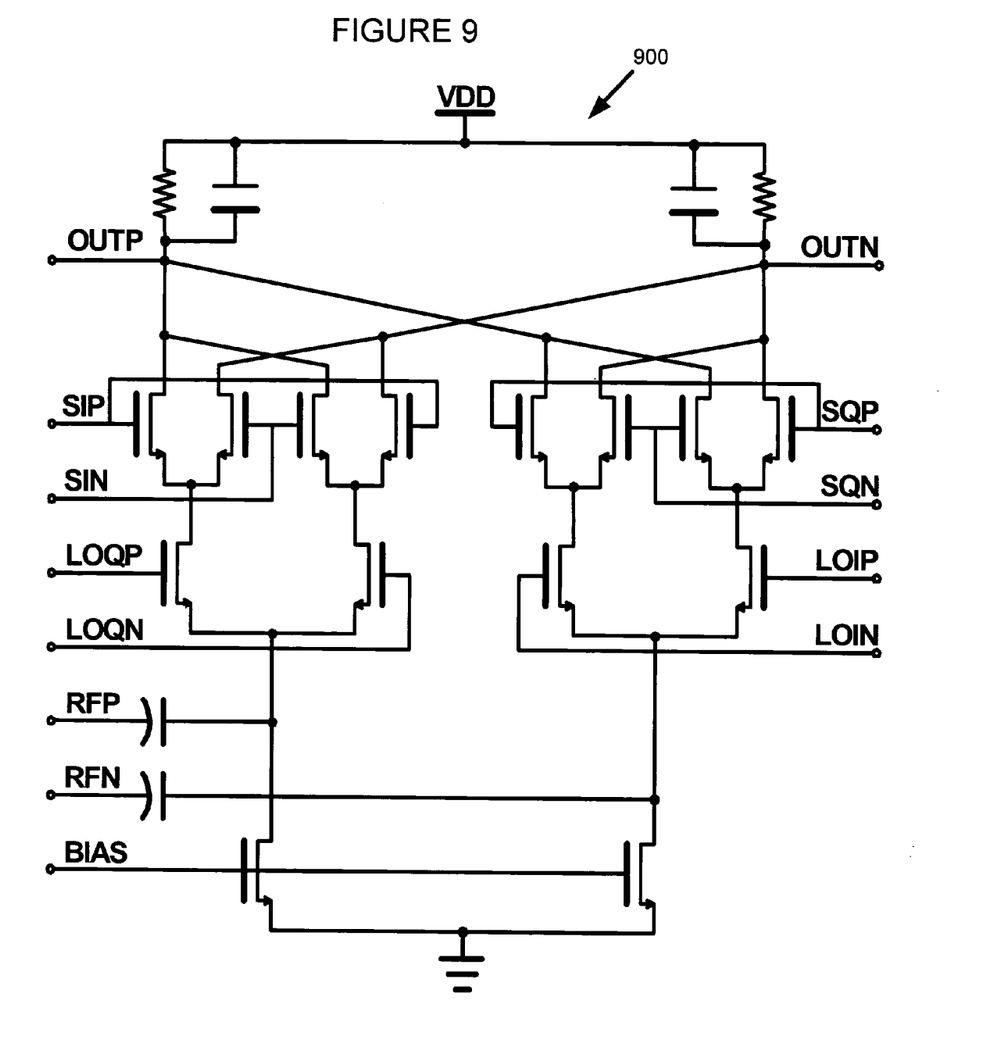
FIG. 9 shows a sensor circuit for transmitter LO leakage and sideband image sensing, that may be utilized in the calibration system according to the first embodiment of the invention.

It is hard to measure the strength of LO leakage and sideband image accurately at an RF frequency, so a sensor circuit and corresponding amplifier have been designed by the inventors of this application in order to do the measurement at baseband. To accurately perform the measurement, the LO leakage and sideband image are converted into a DC voltage through a mixer, which filters out other tones in the sensor output to avoid any phase-modulation/amplitude modulation (PM-AM) conversion. FIG. 9 shows a circuit architecture of a sensor circuit 900 that performs both LO leakage and sideband image sensing, whereby the quadrature connection is opposite to the connection of the transmitter up-conversion mixer and whereby the RF inputs are directly from the on-chip power amplifier (PA) output. For example, the quadrature LO signals are $\sin(\omega_{LO}t)$ and $\cos(\omega_{LO}t+\phi_{iq3})$, the input quadrature tones are $\sin(\omega_s t)$ and $(1+\alpha_{iq1})\cos(\omega_s t+\phi_{iq1})$ and the static phase delay is $\gamma$. If the signal output is $A\sin(\omega_{LO}t+\omega_s t+\gamma)$, the LO leakage can be expressed as $C\sin(\omega_{LO}t+\gamma)+D\cos(\omega_{LO}t+\phi_{iq3}+\gamma)$, and the side band image tone can be described by $E\sin(\omega_{LO}t-\omega_s t+\gamma)-F\cos(\omega_{LO}t-\omega_s t+\phi_{iq3}+\gamma)$. When doing LO leakage strength measurement, the inputs SIP, SQP are high, SIN and SQN are low and quadrature LO signals are added. The output of the sensor circuit can be expressed as:

$$[A\sin(\omega_{LO}t+\omega_s t+\gamma)+C\sin(\omega_{LO}t+\gamma)+D\cos(\omega_{LO}t+\phi_{iq3}+\gamma)+$$
$$E\sin(\omega_{LO}t-\omega_s t+\gamma)-F\cos(\omega_{LO}t-\omega_s t+\phi_{iq3}+\gamma)]$$
$$[\sin(\omega_{LO}t)-\cos(\omega_{LO}t+\phi_{iq3})]=$$
$$\frac{C+D}{2}\cos(\gamma)+\frac{A}{2}\cos(\omega_s t+\gamma)-\frac{A}{2}\sin(\omega_s t+\gamma+\phi_{iq3})+$$
$$\frac{E}{2}\cos(\omega_s t-\gamma)+\frac{E}{2}\sin(\omega_s t-\gamma+\phi_{iq3})+\frac{F}{2}\sin(\omega_s t-\gamma)-$$
$$\frac{F}{2}\cos(\omega_s t-\gamma)-\frac{C}{2}\cos(2\omega_{LO}t+\gamma)-\frac{D}{2}\cos(2\omega_{LO}t+\gamma)-$$
$$\frac{A}{2}\cos(2\omega_{LO}t+\omega_s t+\gamma+\phi_{iq3})-\frac{A}{2}\sin(2\omega_{LO}t+\omega_s t+\gamma+\phi_{iq3})-$$
$$\frac{E}{2}\cos(2\omega_{LO}t-\omega_s t+\gamma)-\frac{E}{2}\sin(2\omega_{LO}t-\omega_s t+\gamma+\phi_{iq3})-$$
$$\frac{F}{2}\sin(2\omega_{LO}t-\omega_s t+\gamma+2\phi_{iq3})+\frac{F}{2}\cos(2\omega_{LO}t-\omega_s t+\gamma+2\phi_{iq3})$$

e DC value $$\frac{C+D}{2}\cos(\gamma)$$

stands for the strength of the LO leakage. When doing sideband image measurement, the test input tone is used to generate the quadrature differential signals, which has full swing and is adopted as the low frequency LO input SIP, SIN, SQP and SQN to the sensor circuit. The quadrature LO signals are still fed into the circuit. The sensor's output under these inputs is $$[A\sin(\omega_{LO}t+\omega_s t+\gamma)+C\sin(\omega_{LO}t+\gamma)+D\cos(\omega_{LO}t+\phi_{iq3}+\gamma)+$$
$$E\cos(\omega_{LO}t-\omega_s t+\gamma)-F\cos(\omega_{LO}t-\omega_s t+\phi_{iq3}+\gamma)]$$
$$[\sin(\omega_{LO}t)\cos(\omega_s t)-\cos(\omega_{LO}t+\phi_{iq3})\sin(\omega_s t)]\approx$$
$$[A\sin(\omega_{LO}t+\omega_s t+\gamma)+C\sin(\omega_{LO}t+\gamma)+D\cos(\omega_{LO}t+\phi_{iq3}+\gamma)+$$
$$E\cos(\omega_{LO}t-\omega_s t+\gamma)-F\cos(\omega_{LO}t-\omega_s t+\phi_{iq3}+\gamma)]$$
$$\sin(\omega_{LO}t-\omega_s t)=\frac{E}{2}\cos\gamma+\frac{F}{2}\sin(\phi_{iq3}+\gamma)+\frac{A}{2}\cos(2\omega_{LO}t+\gamma)+$$
$$\frac{A}{2}\cos(2\omega_s t+\gamma)+\frac{C}{2}\cos(2\omega_{LO}t-\omega_s t+\gamma)+\frac{C}{2}\cos(\omega_s t+\gamma)+$$
$$\frac{D}{2}\sin(2\omega_{LO}t-\omega_s t+\phi_{iq3}+\gamma)-\frac{D}{2}\sin(\omega_s t-\phi_{iq3}-\gamma)+$$
$$\frac{E}{2}\cos(2\omega_{LO}t-2\omega_s t+\gamma)-\frac{F}{2}\sin(2\omega_{LO}t-2\omega_s t+\phi_{iq3}+\gamma),$$

the DC value $\frac{E}{2}\cos\gamma+\frac{F}{2}\sin(\phi_{iq3}+\gamma)$ is the strength of the sideband image tone. The generated DC voltage by the sensor circuit to denote the LO leakage and sideband image tone strength is changed according to the phase delay $\gamma$ of the upconversion mixer and PA pre-driver. Also, the phase delay $\gamma$ is not large at the RF tuning peak frequency of the transmitter, which can serve as the frequency band in which the calibration is done. Under this condition, the measured LO leakage strength and sideband image tone strength of the sensor circuit are $$\frac{C+D}{2} \text{ and } \frac{E}{2} + \frac{F}{2}\sin(\phi_{iq3}) \approx \frac{E}{2}$$

respectively.

Figure 10:
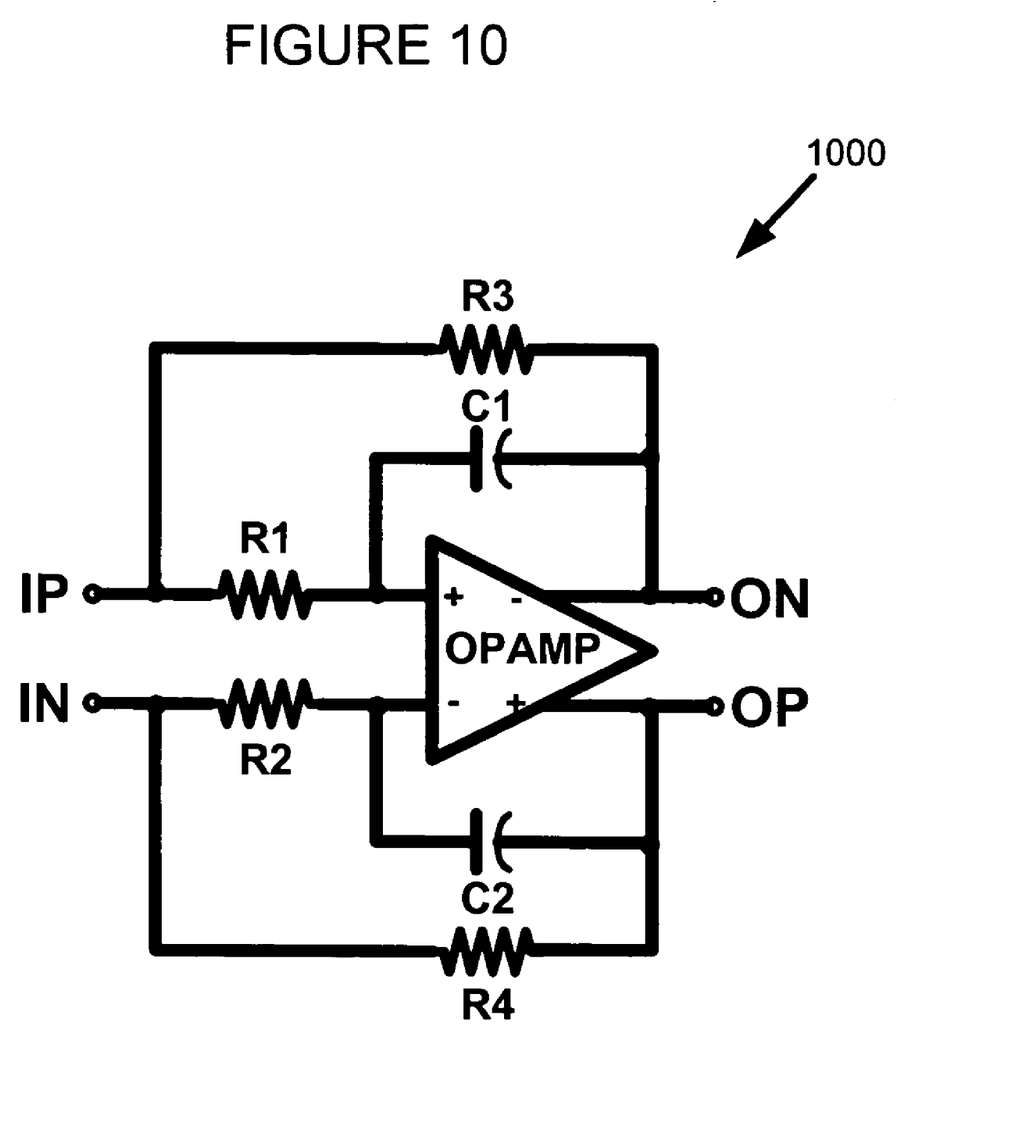
FIG. 10 shows a sensor amplifier that may be utilized in the calibration system according to the first embodiment of the invention.

FIG. 10 shows a sensor amplifier circuit 1000 which may be used in at least one embodiment of the invention, and which further attenuates the generated signals at a test input tone frequency and at twice the test input tone frequency to a negligible number (e.g., close to a zero amplitude value). All of the circuits, including the sensor, sensor amplifier and ADC, have certain amount of mismatch determined by the technology and layout. However, these mismatches are attenuated by the gain of the calibration circuits and are much smaller than mismatches of the transmitter itself, and thus they do not negatively affect the proper calibration of the RF transmitter using such components during a calibration phase.

Figure 11:
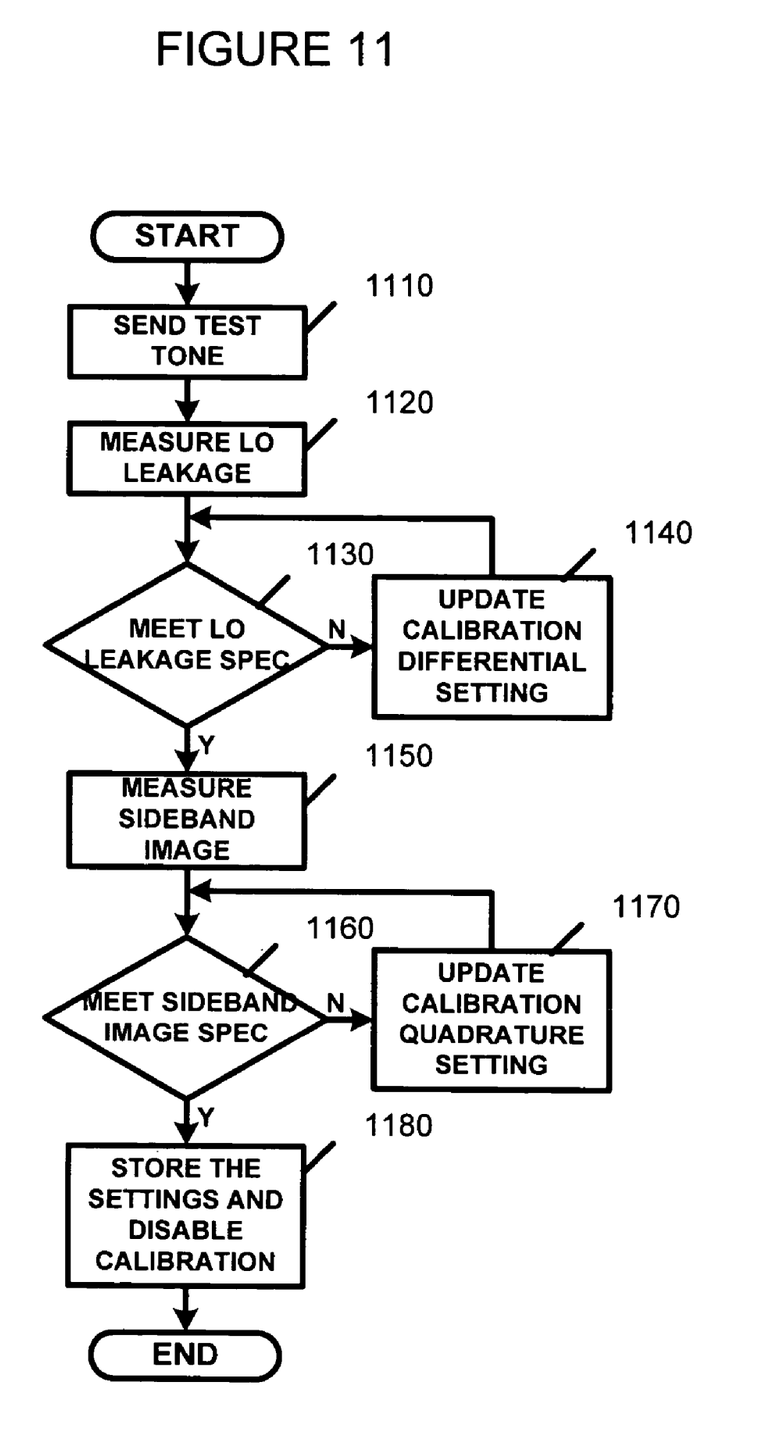
FIG. 11 is a flow chart showing steps that may be performed by a calibration control logic unit that is utilized in the calibration system according to the first embodiment of the invention.

Because the LO leakage strength is mainly related to the circuit differential mismatch and the sideband image strength is mainly related to the circuit quadrature mismatch after the LO leakage calibration, a smart search algorithm has been developed by the inventors of this application in order to expedite (e.g., speed up) the calibration process. As shown in the flow chart of FIG. 11, a test tone is fed into the transmitter circuit when calibration starts, in step 1110. Initially, the sensor circuit is set to measure the LO leakage in step 1120, and the circuit settings inside the I branch and the Q branch to control the differential mismatches are searched to get the minimum LO leakage, in steps 1130 and 1140. After the LO leakage calibration is done, the sideband image calibration is performed by increasing or decreasing either the I or the Q branch setting as a group, to obtain the minimum sideband image strength, in steps 1150, 1160 and 1170. An exhaustive searching algorithm, a smart searching algorithm or a feedback calibration can be utilized, whereby the choice to be used can be made based on parameters such as time constraints, processing power, and the like. Also, since there are several tuning points inside the chip, the partition of mismatch tuning among all those should be based on the knowledge of the contribution of mismatch of different circuit blocks. The calibration settings are stored and calibration is disabled in step 1180.

Figure 12A:
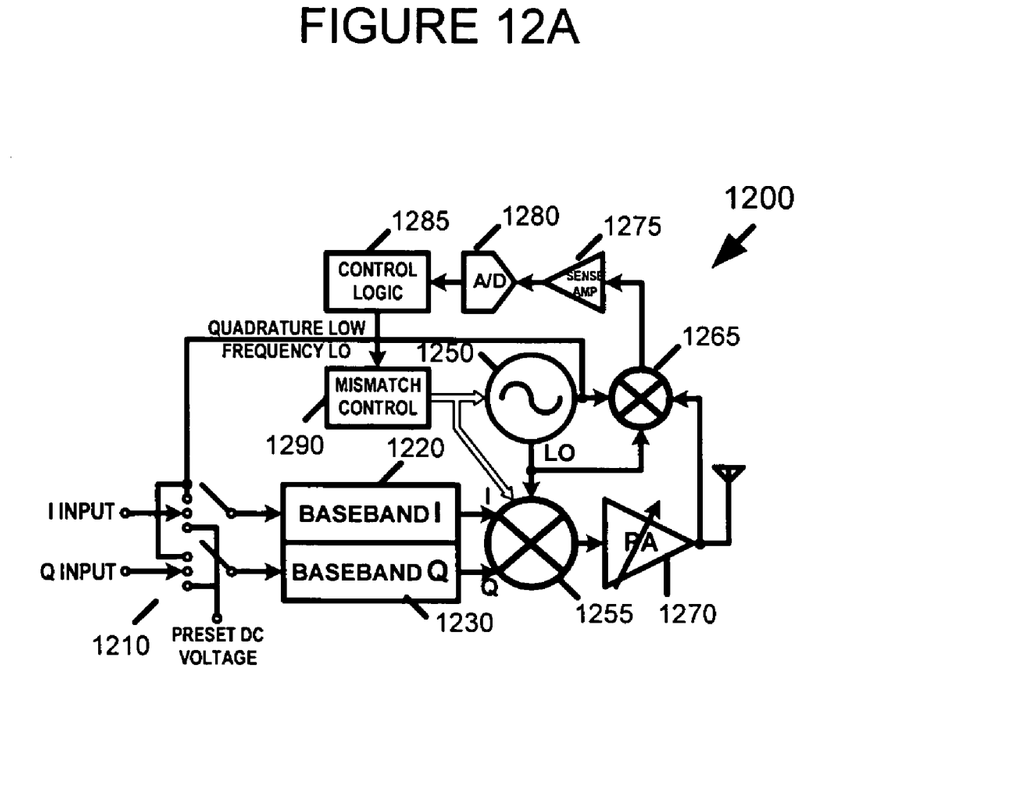
FIGS. 12A-12D show different configurations of an RF transmitter architecture in a calibration mode and in a normal mode of operation.
Figure 12B:
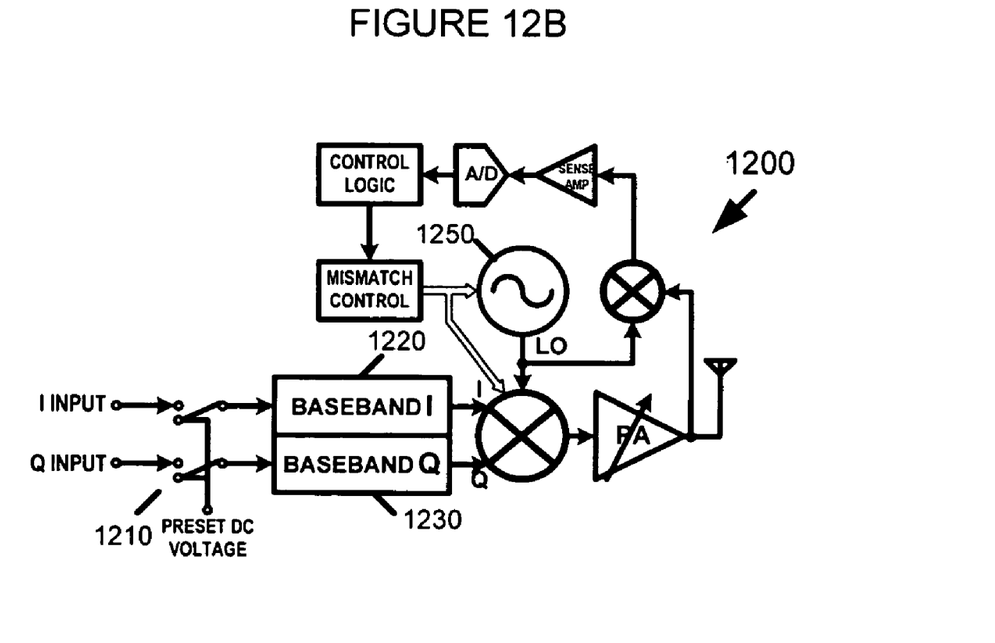

FIGS. 12A-12D show different setups of an RF transmitter with calibration circuitry 1200 according to an embodiment of the invention. In particular, FIG. 12A shows the RF transmitter with calibration circuitry 1200, in which a three-pole, two-throw switch 1210 is set such that no inputs are provided to a Baseband I unit 1220 and a Baseband Q unit 1230. FIG. 12B shows the RF transmitter with calibration circuitry 1200 in a setup for LO Leakage calibration, whereby the switch 1210 is set such that a Preset DC voltage is provided to the Baseband I unit 1220 and the Baseband Q unit 1230. The preset DC voltage serves as the input to the I and Q baseband circuits, whereby it does not affect the LO leakage calibration as discussed previously (e.g., increase or decrease CAL_IP bias current source of FIG. 9 while maintaining the other three bias current sources at the same level). The preset DC voltage may be set to a non-zero voltage value, a zero voltage value, or even to a null value (whereby it is not connected to the baseband circuits) in an alternative configuration.

Figure 12C:
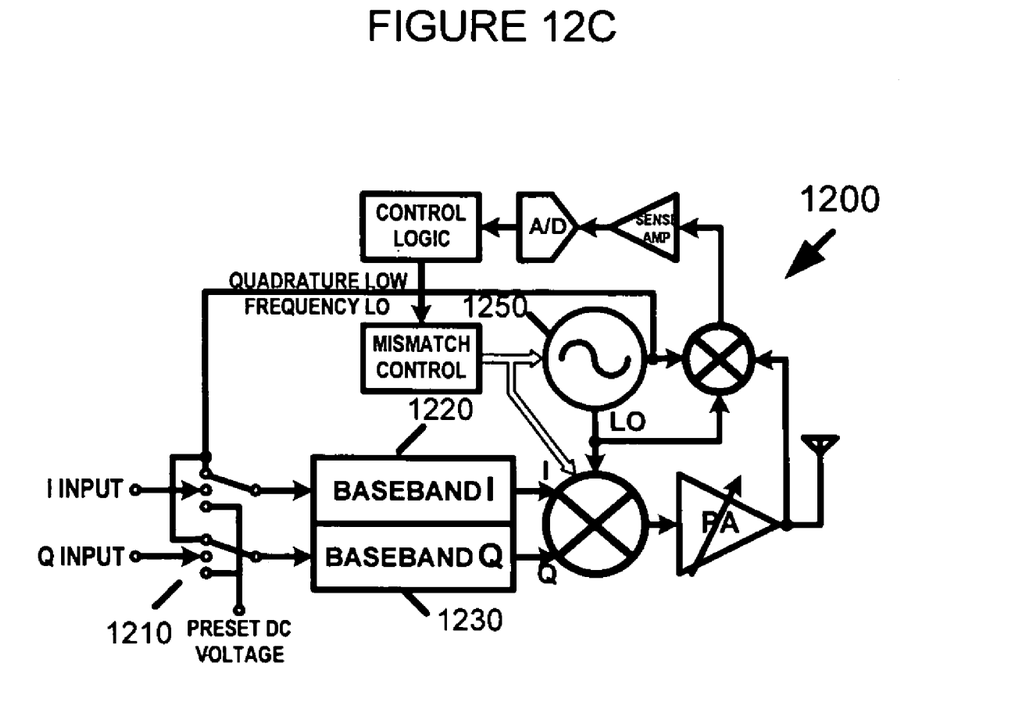

FIG. 12C shows the RF transmitter with calibration circuitry 1200 in a setup for Sideband Image calibration, whereby the switch 1210 is set such that a Quadrature Low Frequency LO signal (output by an LO 1250) is provided to the Baseband I unit 1220 and the Baseband Q unit 1230. The low frequency LO signal is used during sideband image calibration, to serve as a 'test tone' input signal, whereby it does not vary during the sideband image calibration process and whereby it has a predetermined frequency value ($f_{test}$) that remains the same during the sideband image calibration. The calibration performed during the sideband image calibration, with the test tone provided as an input signal, is as described previously with respect to FIG. 9 (for the bias current sources, whereby either CAL_IP and CAL_IN is regulated as a group with the other group that corresponds to CAL_QP and CAL_QN kept at its original value, or vice versa). The sideband image that is formed from the test tone input to the RF transmitter is measured by a sensor circuit for transmitter LO leakage and sideband image sensor, such as the sensor circuit 900 shown in FIG. 9.

In FIGS. 12B and 12C, there is shown LO leakage and sideband image sensing by using direct mixing with an LO to extract the LO leakage as a DC voltage, and slide mixing with the LO and signals at the input tone frequency serving as a quadrature low frequency LO, to extract the sideband image as another DC voltage. The concept of 'slide mixing' is described in detail in a related U.S. patent application Ser. No. 10/887,702, filed Jul. 9, 2004 (the same date herewith), publication No. US2006/0009180A1, entitled RF RECEIVER MISMATCH CALIBRATION SYSTEM AND METHOD, which is assigned to the same assignee as this application and which is incorporated in its entirety herein by reference.

Figure 12D:
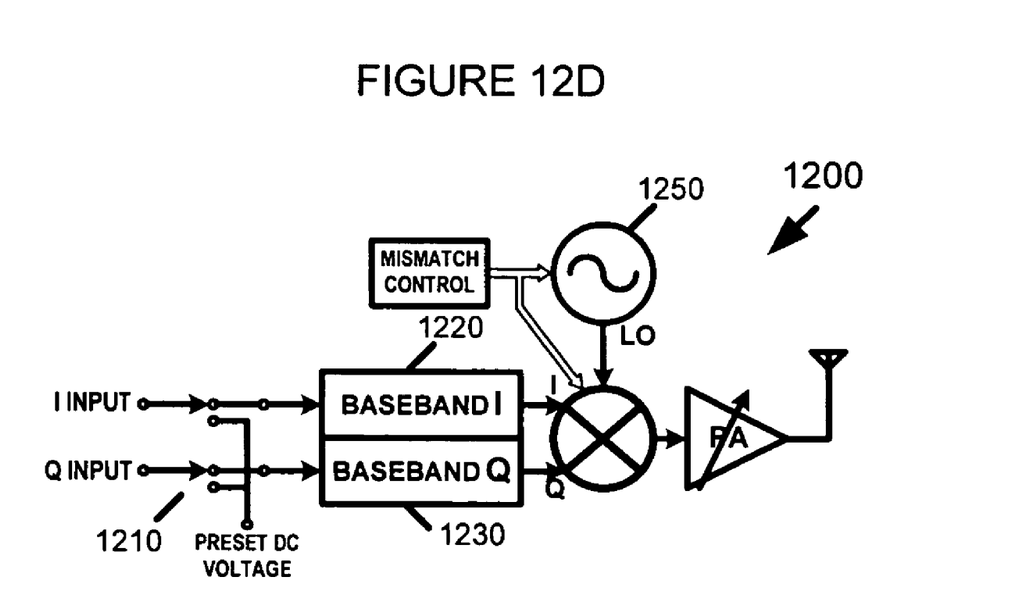

FIG. 12D shows the RF transmitter with calibration circuitry 1200 in a normal operation mode, whereby the switch 1210 is set such that the I and Q inputs (e.g., from a baseband unit that outputs I and Q data, not shown) are provided to the Baseband I unit 1220 and the Baseband Q unit 1230, respectively.

In FIGS. 12A-12C, the LO 1250 and the mixer 1255 are mismatch controlled by a feedback path that includes a mixer 1265 (that mixes outputs of the LO 1250 and an output of the power amplifier 1270), a sense amplifier 1275, an A/D 1285, and a mismatch control unit 1290. Comparing that feedback path of FIGS. 12A-12C to the one shown in FIG. 5, the LO 1250 and the mixer 1255 and the power amplifier 1275 correspond to the RF transmitter 510 of FIG. 5, and the control logic 1285 and the mismatch control 1290 correspond to the calibration control logic unit 520 of FIG. 5.

At least of the embodiments of the invention provides at least one of the benefits described below. A) A calibration system and method through LO leakage and sideband image detection of transmitter output signals when injecting an in-band test tone, which can be supported by the transmitter chip itself without the aid of the digital baseband circuit. It can be used in a wireless transceiver chip, or in the transmitter chip only. B) LO leakage and sideband image sensor architecture by using direct mixing with an LO to extract the LO leakage as a DC voltage, and slide mixing with the LO and signals at the input tone frequency serving as low frequency LO, to extract the sideband image as another DC voltage. C) Sensor circuit implementation in a CMOS manufacturing process, whereby the same type of circuit can be designed in other technologies. D) The flow of the calibration, which first does LO leakage calibration to compensate the differential mismatches of the circuit first, and then does sideband image calibration to cancel the quadrature mismatches of the circuit. E) The update methods during the LO leakage and sideband image calibration can be done by an exhaustive searching method, a smart searching method, or a feedback method.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for performing LO leakage and sideband image calibration for an RF transmitter, comprising:
   an LO leakage and sideband image sensor configured to sense an LO leakage amount and a sideband image amount of an output of the RF transmitter;
   a calibration control logic unit configured to receive the sensed LO leakage amount and the sensed sideband image amount and to perform calibration control on the RF transmitter by first calibrating for LO leakage suppression and then calibrating for sideband image suppression; and
   analog circuitry that slide mixes the output of the RF transmitter with an LO signal in connection with calibrating the RF transmitter.

2. The system according to claim 1, further comprising:
   an analog-to-digital converter configured to convert the sensed LO leakage amount and the sensed sideband image amount to first and second sensed values, respectively.

3. The system according to claim 2, further comprising:
   a sense amplifier configured to amplify the sensed LO leakage amount and the sensed sideband image amount, and to output an amplified sensed LO leakage amount and an amplified sensed sideband image amount to the analog-to-digital converter.

4. The system according to claim 1, wherein an input to the RF transmitter during the calibration corresponds to a single tone frequency.

5. The system according to claim 1, further comprising:
   a stopping criteria unit configured to stop calibration of the RF transmitter when both the LO leakage amount and the sideband image amount are less than first and second predetermined thresholds, respectively.

6. The system according to claim 1, further comprising:
   a switch configured to switch either a signal to be transmitted from I and Q input channels to an input port of the RF transmitter during a normal mode of operation of the RF transmitter, or a test tone signal that is provided to the input port of the RF transmitter during the calibration of the RF transmitter.

7. The system according to claim 6, wherein the test tone signal has at least one a single frequency component, a DC voltage, and a null signal.

8. A system for calibrating a quadrature mixer to reduce LO leakage and sideband image, the mixer configured to receive differential signals each including a positive and negative pair, the mixer including a first pair of transistors configured to receive a baseband differential I-channel signal pair, a second pair of transistors configured to receive a baseband differential Q-channel signal pair, a first quartet of transistors configured to receive a local oscillator differential Q-channel signal pair, and a second quartet of transistors configured to receive a local oscillator differential I-channel signal pair, the system comprising:
   a positive I-channel current source coupled to the first pair of transistors;
   a negative I-channel current source coupled to the first pair of transistors;
   a positive Q-channel current source coupled to the second pair of transistors;
   a negative Q-channel current source coupled to the second pair of transistors;
   a computing unit that computes a LO leakage and a sideband image from an output of the mixer; and
   a bias control logic unit configured to control the current sources such that: a) one of the four current sources is regulated by a first amount and the other three current sources are each regulated by a second amount, in order to compute a minimum LO leakage value from the computing unit, and b) the I-channel pair of current sources are each regulated by a third amount and the Q-channel pair of current sources are each regulated by a fourth amount, in order to compute a minimum sideband image from the computing unit.

9. The system according to claim 8, wherein the fourth amount is zero.

10. The system according to claim 8, wherein the current sources are regulated using an exhaustive search algorithm.

11. A method for calibrating an RF transmitter, comprising:
   inputting a test tone to the RF transmitter;
   performing LO leakage calibration on an output of the RF transmitter with the test tone inputted thereto, in order to determine a minimum LO leakage;
   thereafter, performing sideband image calibration on the output of the RF transmitter with the test tone inputted thereto, in order to determine a minimum sideband image; and
   storing operational values for the RF transmitter based on the detected minimum LO leakage and the detected minimum sideband image, to be used during a normal operation mode of the RF transmitter;
   wherein analog circuitry is used in the RF transmitter calibration process to slide mix the output of the RF transmitter with an LO signal.

12. A method of calibrating an RF transmitter, comprising:
   inputting a test tone to the RF transmitter;
   performing LO leakage calibration on an output of the RF transmitter with the test tone inputted thereto, in order to determine a minimum LO leakage;
   thereafter, performing sideband image calibration on the output of the RF transmitter with the test tone inputted thereto, in order to determine a minimum sideband image; and
   storing operational values for the RF transmitter based on the detected minimum LO leakage and the detected minimum sideband image, to be used during a normal operation mode of the RF transmitter;
   wherein a P, N differential pair of I channel bias current sources and a P, N differential pair of Q channel bias current sources are coupled to the RF transmitter, and
   wherein the step of performing LO leakage calibration comprises:
      changing a value of one of the four bias current sources while maintaining the other three bias current sources unchanged; and determining the value of the one of the four bias current sources that results in the minimum LO leakage being detected.

13. The method according to claim 12, wherein the step of performing sideband image calibration comprises:
changing a value of both bias current sources in one of the two pairs of bias current sources by a first amount while a value of both of the other two bias current sources in the other of the two pairs by a second amount; and
determining the value of the both bias current sources in the one of the two pairs of bias current sources that results in the minimum sideband image being detected.

14. The system method according to claim 13, wherein the second amount is zero.

15. A method of calibrating an RF transmitter, comprising:
a) inputting a low frequency LO signal as an input to the RF transmitter;
b) performing direct mixing of an output of the RF transmitter with a high frequency LO signal, and extracting an LO leakage of the RF transmitter as a first DC voltage;
c) performing slide mixing of the output of the RF transmitter with the low frequency LO signal and the high frequency LO signal, and extracting a sideband image of the RF transmitter as a second DC voltage; and
d) determining whether the first and second DC voltages are less than first and second threshold voltages, and if so, saving calibration settings and entering a normal operation mode, and if not,
d1) changing at least one characteristic of the RF transmitter and returning to step a) to continue calibrating the RF transmitter.

16. The method according to claim 15, wherein the at least characteristic of the RF transmitter that is changed in step d1) is a bias current amount provided to one of an I channel and a Q channel of the RF transmitter.

17. A system for calibrating an RF transmitter, comprising:
an LO configured to provide, during a calibration mode, a first LO signal and a second LO signal, the second LO signal having a higher frequency than the first LO signal;
an input port configured to receive the first LO signal as an input to the RF transmitter during the calibration mode;
a mixer configured to mix an output of the RF transmitter during the calibration mode with the first LO signal in a first mode of operation, and to perform slide mixing of the output of the RF transmitter with the first and second LO signals during a second mode of operation;
a voltage detector configured to detect, a first DC voltage, a voltage of the mixer when the mixer is operating in the first mode of operation, and to detect, as a second DC voltage, the output of the mixer when the mixer is operating in the second mode of operation, wherein the first and second voltages respectively correspond to an LO Leakage of the RF transmitter and a Sideband Image of the RF transmitter; and
a processing unit that modifyies at least one characteristic of the RF transmitter when at least one of the first and second DC voltages is greater than first and second predetermined voltages, respectively, and that continues calibration of the RF transmitter with the RF transmitter having the modified characteristic.

18. The system according to claim 17, wherein the at least characteristic of the RF transmitter that is changed is a bias current amount provided to one of an I channel and a Q channel of the RF transmitter.

19. The system according to claim 17, wherein the second mode of operation occurs after the first mode of operation has finished.

* * * * *